United States Patent [19]

Nakajima

[11] Patent Number: 4,557,579
[45] Date of Patent: Dec. 10, 1985

[54] AUTOMATIC FOCUSSING APPARATUS

[75] Inventor: Yukio Nakajima, Kanagawa, Japan

[73] Assignee: Olympus Optical Co., Ltd., Tokyo, Japan

[21] Appl. No.: 559,429

[22] Filed: Dec. 8, 1983

[30] Foreign Application Priority Data

Feb. 11, 1983 [JP] Japan ................................. 58-20846
Feb. 28, 1983 [JP] Japan ................................. 58-33655

[51] Int. Cl.[4] .......................... G03B 17/00; G03B 3/10
[52] U.S. Cl. .................................... 354/402; 354/286; 354/484
[58] Field of Search ............... 354/402, 400, 401, 403, 354/404, 405, 406, 407, 408, 409, 286, 418, 484

[56] References Cited

U.S. PATENT DOCUMENTS 4,091,395 5/1978 Kozuki et al. .................. 354/173.1
4,400,075 8/1983 Tomori et al. ...................... 354/286
4,423,935 1/1984 Eguchi et al. ....................... 354/402

Primary Examiner—Russell E. Adams
Assistant Examiner—David M. Gray
Attorney, Agent, or Firm—Louis Weinstein

[57] ABSTRACT

An automatic focussing apparatus includes an operating switch disposed on a camera which may be closed to energize an in-focus detector circuit from a battery contained within the camera and to energize a motor drive circuit from another battery contained within a lens barrel. The apparatus also includes an operating switch mounted on the lens barrel which may be turned on to energize the in-focus detector circuit and the motor drive circuit from a battery disposed within the lens barrel. Focussing signals representing the magnitude and direction of lens movement from the focussing processor may be coupled to the motor control circuit through two control lines in one embodiment or only one control line in a second embodiment.

16 Claims, 42 Drawing Figures

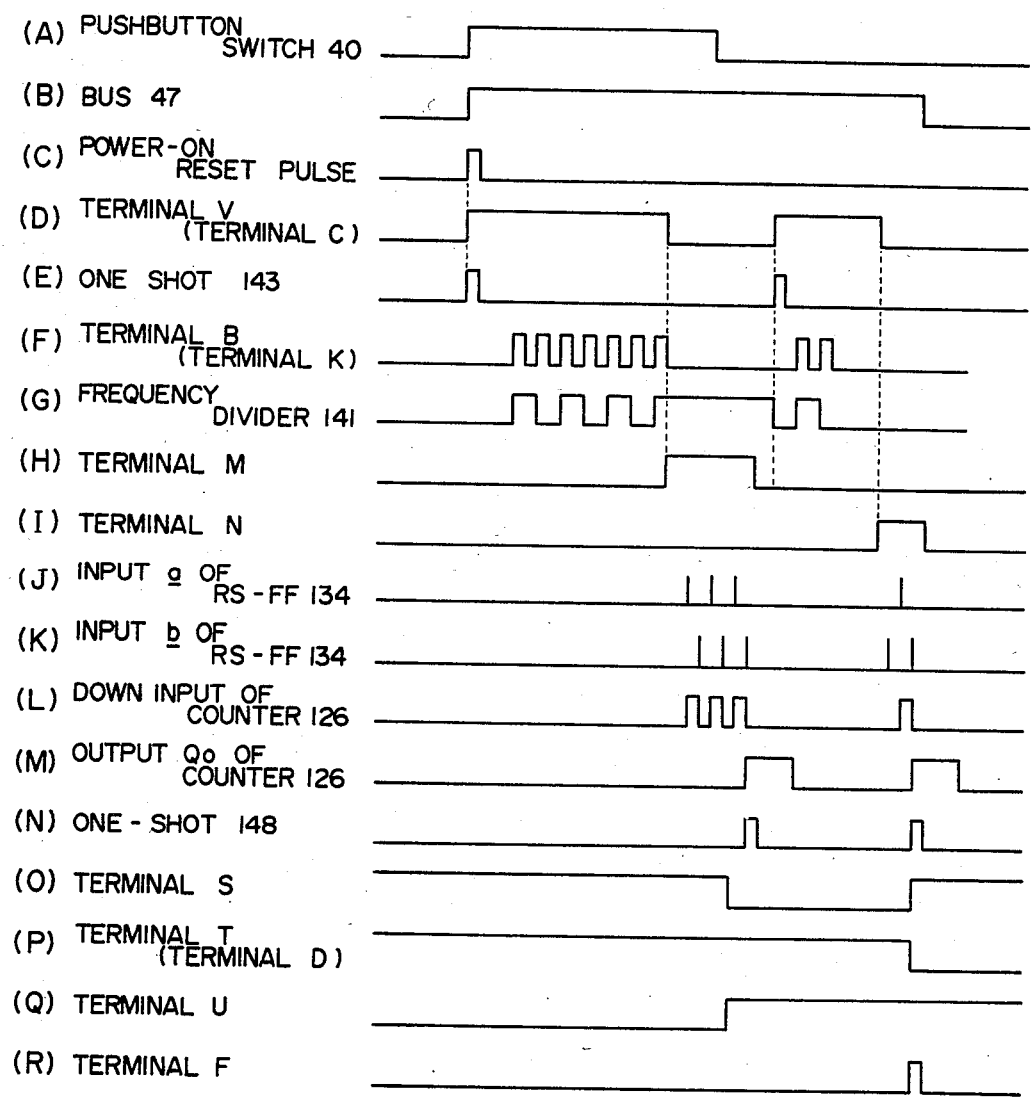

AUTOMATIC FOCUSSING APPARATUS

BACKGROUND OF THE INVENTION

The invention relates to an automatic focussing apparatus, and more particularly, to an automatic focussing apparatus comprising a combination of a camera which is capable of detecting a focus condition on an imaging surface to provide lens motion information which is used to drive a taking lens toward an in-focus position, and a lens barrel which is responsive to lens motion information from the camera to drive the taking lens by means of a motor.

In a conventional automatic focussing apparatus including a combination of a focussing camera and a lens barrel as described above, switches are provided on the camera and on the lens barrel, respectively, so that either switch may be turned on to activate an automatic focussing mechanism (Japanese Laid-Open Patent Application No. 49,927/1982). In this apparatus, a battery is internally housed within the camera to feed an in-focus detector circuit provided on the camera side while the lens barrel internally houses another battery which feeds a motor drive circuit for the lens barrel. This causes an inconvenience in that the automatic focussing apparatus may fail to operate or may operate in an unstable manner if the battery within the camera has been dissipated to a degree that the in-focus detector circuit is not properly fed. In particular, because of the space limitation, the battery housed within the camera is generally of a reduced capacity, and hence is exhausted rapidly. Accordingly, there is a high likelihood that the focussing mechanism may fail to operate even though the battery housed within the lens barrel has sufficient power capacity left to activate the motor drive circuit.

In an automatic focussing apparatus of the kind described, it is necessary to determine whether a deviation in the focus position represents a front or a rear focus, in order to move the taking lens in accordance with a deviation detected on the imaging surface. Thus, both the magnitude and the direction of the deviation must be transmitted from the camera to the lens barrel. This requires the provision of a pair of signal paths in order to transmit information relating to the magnitude of the deviation separately from information representing the direction of the deviation or to transmit the magnitude of the deviation on separate paths corresponding to each direction of deviation. However, it will be appreciated that a reduction in the number of signal paths between the camera and the lens barrel and hence of electrical contacts is highly desirable to achieve a simplified construction and increased reliability.

SUMMARY OF THE INVENTION

In view of the foregoing, it is an object of the invention to provide an automatic focussing apparatus including an automatic focussing mechanism which may be activated by turning either one of the switches provided on a camera and a lens barrel, respectively, and which can be activated upon exhaustion of a battery contained within the camera, by feeding an in-focus detector circuit and a motor drive circuit both from a battery contained within the lens barrel.

It is another object of the invention to provide an automatic focussing apparatus of the kind described in which information representing both the magnitude and the direction of a deviation of the focus position on an imaging surface is converted into a single pulse train, which can be transmitted from the camera to the lens barrel through a single signal path.

In accordance with the invention, an in-focus detector circuit disposed within a camera can be fed from a battery of an increased capacity which is housed within a lens barrel when either the switch on the camera or on the lens barrel is operated. This allows the capacity required of a battery housed within the camera to be reduced and allows a proper focussing operation to be performed if the battery within the camera is exhausted. In addition, focus information representing the magnitude and the direction of a deviation in the focus position is converted into a single pulse train when transmitting it from the camera to the lens barrel. The pulse train can be decoded to determine the magnitude and the direction in which the taking lens should be driven in order to achieve a focussing operation. Accordingly, a single signal path may be provided, thus reducing the number of electrical contacts which must be provided, simplifying the construction and improving the reliability.

BRIEF DESCRIPTION OF THE DRAWINGS

FIGS. 9(A) to (R) are a series of timing charts illustrating the operation of various parts of the apparatus shown in FIG. 6.

DESCRIPTION OF PREFERRED EMBODIMENTS

Figure 1:
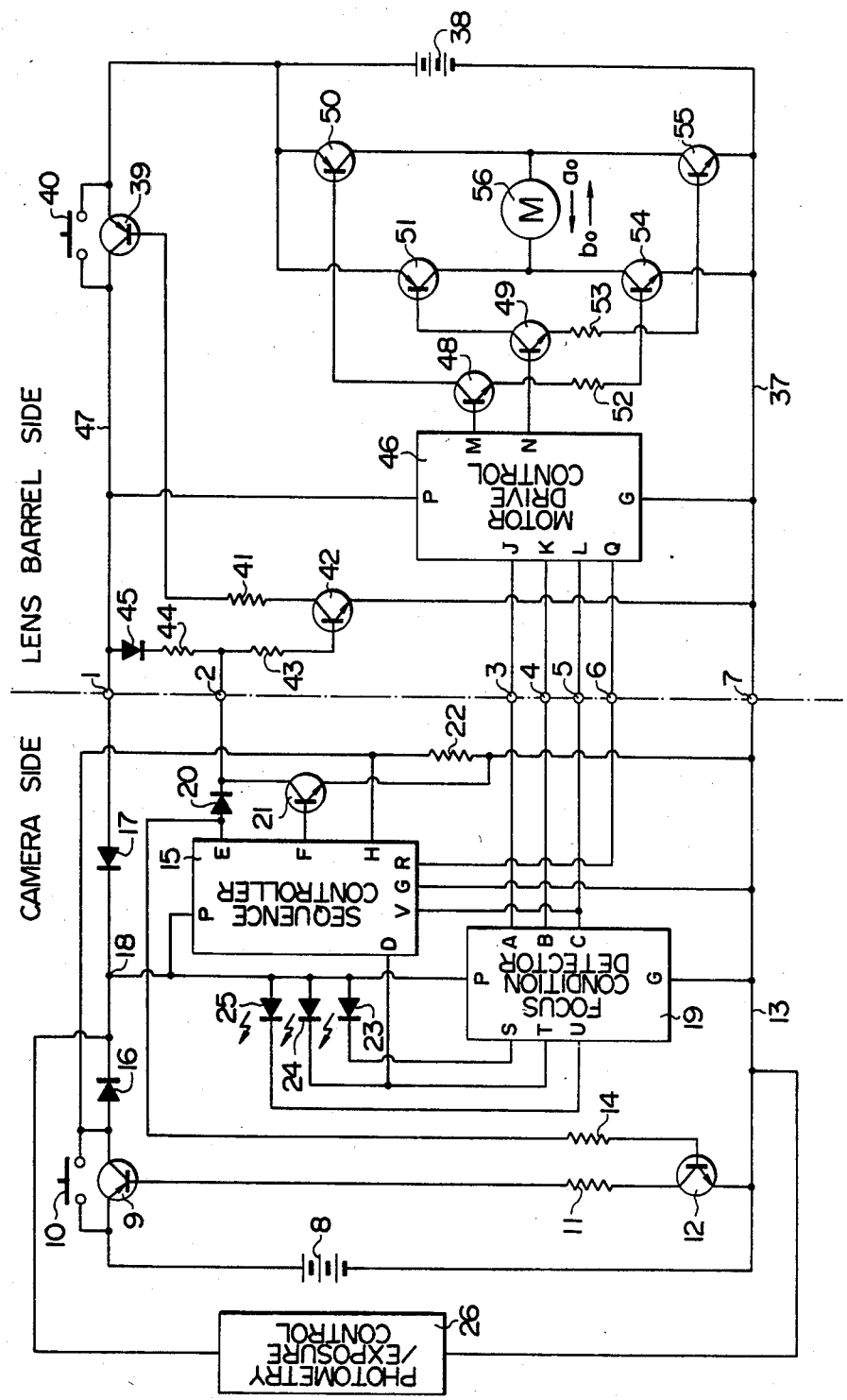
FIG. 1 is a circuit diagram of an automatic focussing apparatus according to one embodiment of the invention.

Referring to FIG. 1, there is shown a circuit diagram of the electrical circuit of an automatic focussing apparatus. An electrical circuit which is contained within a camera is shown to the left, and an electrical circuit contained within a lens barrel is shown to the right of a vertical centerline shown as a phantom line, and the aforesaid electrical circuits are connected together through seven electrical contacts 1 to 7, shown on the centerline, and which are formed in the mounting surfaces of the camera and the lens barrel.

Initially considering the circuit arrangement of the camera, the camera internally houses a battery 8, the positive terminal of which is connected to the emitter of a PNP transistor 9 and also connected through a pushbutton switch 10 to the collector thereof. The pushbutton switch 10 is closed during a first stroke of a shutter release button as it is depressed. The base of the transistor 9 is connected through a resistor 11 to the collector of an NPN transistor 12, the emitter of which is connected to a ground potential bus 13 which is in turn connected to the negative terminal of the battery 8. The base of the transistor 12 is connected through a resistor 14 to an output terminal E of a sequence controller 15. The transistors 9 and 12 form a power sustain circuit which is fed from the terminal E of the sequence controller 15 when the switch 10 is turned on to maintain the power supply until a series of automatic focussing operations are completed.

The collector of the transistor 9 is connected to the anode of a diode 16, the cathode of which is connected to the cathode of a diode 17. The anode of the diode 17 is connected to the contact 1 which is connected with a supply bus leading from the lens barrel. The junction 18 between the diodes 16, 17 is connected to a power supply terminal P of the sequence controller 15 and to a terminal P of a focus condition detector circuit 19. Both the sequence controller 15 and the focus condition detector circuit 19 include a ground terminal G each of which is connected to the bus 13. Thus it will be seen that both the sequence controller 15 and the focus condition detector circuit 19 can be selectively fed from either the battery 8 housed within the camera or a battery 38 housed within the lens barrel through diodes 16, 17, respectively. The sequence controller 15 operates to control sequences of operations within the camera and the lens barrel, respectively, while the detector circuit 19 operates to detect an imaging condition of a light image of an object being photographed which has passed through a taking lens.

The output terminal E of the sequence controller 15 is connected to the anode of a diode 20, the cathode of which is connected to the contact 2 and also connected to the collector of an NPN transistor 21 through resistor 43. The purpose of the transistor 21 is to interrupt the power supply from the lens barrel side when such supply is no longer necessary. Specifically, the base of the transistor 21 is connected to a terminal F of the sequence controller 15 while its emitter is connected to the bus 13. The sequence controller 15 includes an input terminal H which is connected to the anode of the diode 16 and which is also connected to the bus 13 through a resistor 22. The sequence controller 15 also includes a reset terminal R which is connected to the contact 6. Finally, the sequence controller 15 includes an input terminal D and a terminal V which are connected to output terminals T, C, respectively, of the detector circuit 19. The detector circuit 19 additionally includes a front focus output terminal S, an in-focus output terminal T and a rear focus output terminal U, which are connected to the cathodes of light emitting diodes (hereafter abbreviated as LED) 23, 24, 25, respectively, which are disposed within a finder. The anodes of these diodes are connected to the junction 18. The detector circuit 19 also includes output terminals A, B, C which are connected to contacts 3, 4, 5, respectively. The camera also includes a photometry/exposure control circuit 26 connected between the junction 18 and the bus 13 so as to be fed therefrom. The circuit 26 operates to determine the brightness of an object being photographed in order to determine the correct amount of exposure. The bus 13 within the camera is connected through the contact 7 to a ground potential bus 37 within the lens barrel which is in turn connected to the negative terminal of the battery 38 housed therein.

Considering the circuit arrangement within the lens barrel, the lens barrel internally houses the battery 38, the positive terminal of which is connected to the emitter of a PNP transistor 39 and is also connected through a pushbutton switch 40 to the collector thereof. The base of the transistor 39 is connected through a resistor 41 to the collector of an NPN transistor 42, the emitter of which is connected to the bus 37. The base of the transistor 42 is connected through a series combination of resistors 43, 44 to the cathode of a diode 45, the anode of which is connected to the collector of the transistor 39 and connected to the bus 47 which is in turn connected to the contact 1. The junction between the resistors 43, 44 is connected to the contact 2. The combination of the transistors 39, 42 and diode 45 forms a power sustain circuit which maintains the power supply from the battery 38 whenever the switch 40 is turned on. It is also to be noted that the transistors 39, 42 are also responsive to an output from the terminal E of the sequence controller 15 when the switch 10 is turned on. The supply bus 47 is connected to a power supply terminal P of a motor drive control circuit 46, the ground terminal G of which is connected to the ground bus 37. The motor drive control circuit 46 includes input terminals J, K and L, which are connected to the contacts 3, 4 and 5, respectively, and also includes an output terminal Q which is connected to the contact 6. The motor drive control circuit 46 also includes a pair of output terminals M, N which are connected to the bases of NPN transistors 48, 49, respectively, to provide a motor drive output. The transistors 48, 49 have their collectors connected to the bases of PNP transistors 50, 51, respectively, and have their emitters connected through resistors 52, 53, respectively, to the bases of NPN transistors 54, 55, respectively. The transistors 50, 51 have their emitters connected to the positive terminal of the battery 38, and the transistors 54, 55 have their emitters connected to the ground bus 37. The collectors of the transistors 50, 55 are connected to one end, and the collectors of the transistors 51, 54 are connected to the other end of a motor 56 which is used to drive a taking lens.

Figure 2:
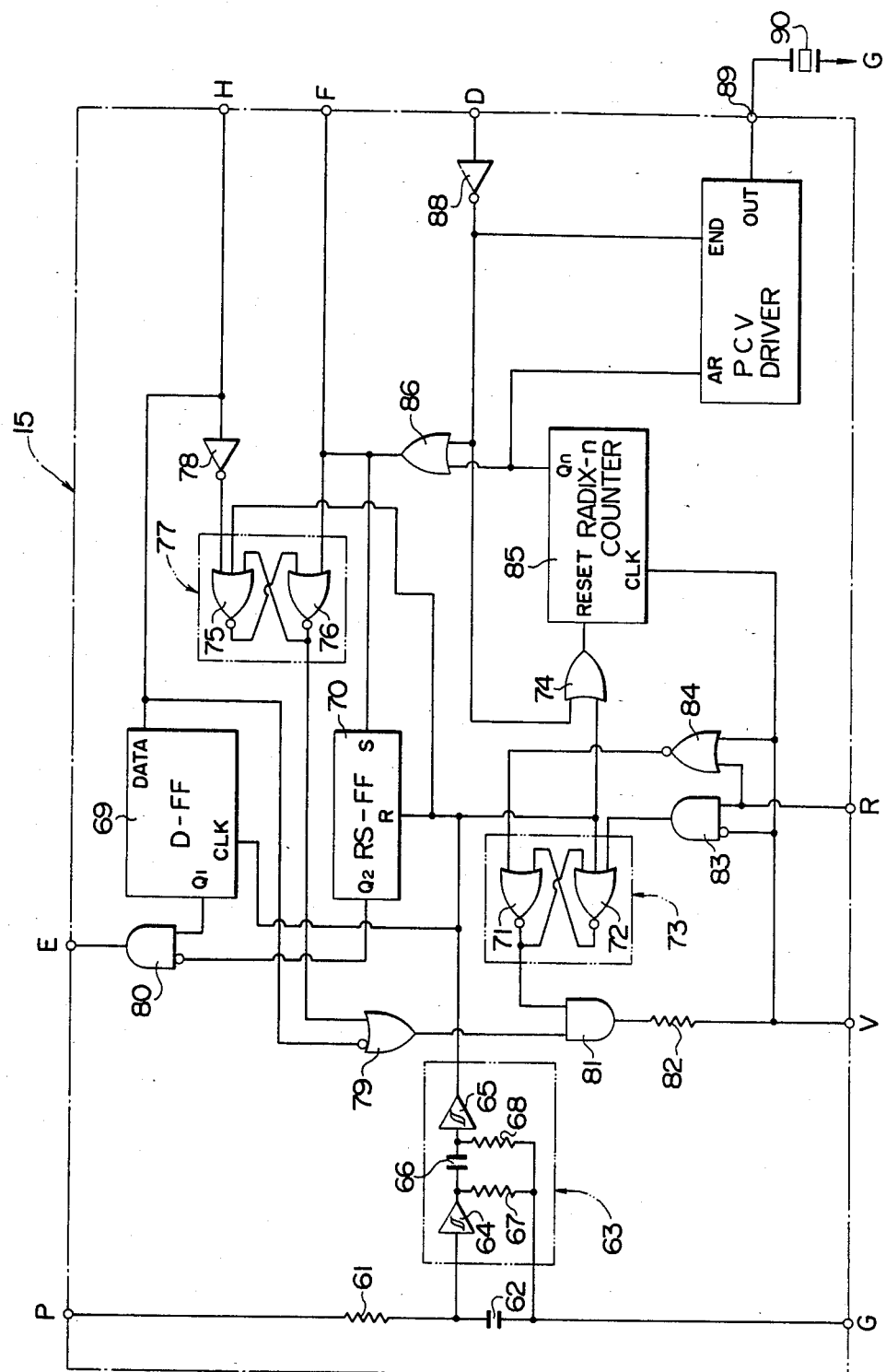
FIG. 2 is a circuit diagram of a sequence controller shown in FIG. 1.

FIG. 2 is a block diagram specifically illustrating the sequence controller 15 shown in FIG. 1. In this Figure, a series combination of resistor 61 and capacitor 62 is connected across the terminals P, G, with the junction therebetween being connected to an input to a power on reset circuit 63 which is adapted to produce a reset pulse of a given duration at the time when the power supply is initiated. The reset circuit 63 comprises a pair of schnitt trigger inverters 64, 65 disposed at the input and the output end thereof, a capacitor 66 connected between the aforesaid inverters, and a pair of resistors 67, 68 each having a first end connected to each end of the capacitor 66 and a second end connected to the terminal G. An output from the reset circuit 63 is fed to a number of locations including clock terminal CLK of D-type flipflop (hereafter abbreviated as D-FF) 69, a reset terminal R of an RS-type flipflop (hereafter abbreviated as RS-FF) 70, a first set input terminal of RS-FF 73 formed by a combination of a two input NOR gate 71 and a three input NOR gate 72, one input terminal of OR gate 74 and a first set input terminal of RS-FF 77 formed by a combination of a three input NOR gate 75 and a two input NOR gate 76.

D-FF 69 has an input terminal DATA which is connected to the input terminal H of the sequence controller 15 and also connected through an inverter 78 to a second set input terminal of RS-FF 77. The output terminal of RS-FF 77 is connected to one input terminal of OR gate 79, while the other negative logic input terminal of RS-FF being connected to the terminal H.

D-FF 69 has an output terminal $Q_1$ which is connected to one input terminal of AND gate 80, and RS-FF, 70 has an output terminal $Q_2$ which is connected to the negative logic input terminal of AND gate 80. The output terminal of AND gate 80 is connected to the terminal E of the sequence controller 15. The output terminal of OR gate 79 is connected to one input terminal of AND gate 81, the other input terminal of which is connected to the output terminal of RS-FF 73. The output terminal of AND gate 81 is connected through a resistor 82 to the terminal V of the sequence controller 15. The terminal V is also connected to one negative logic input terminal of AND gate 83, to one input terminal of NOR gate 84 and to a clock terminal CLK of a radix-n counter 85, formed by a ring counter.

The radix-n counter 85 counts the number of times a focussing operation is repeated to reach an in-focus position. When it counts a given count (equal to n), its output terminal $Q_n$ changes from its low level (hereafter referred to as "L" level) to a high level (hereafter referred to as "H" level). After counting n counts, it returns to initiate counting over again. The other input terminal of AND gate 83 and NOR gate 84 is connected to the reset terminal R of the sequence controller 15. The output terminal of AND gate 83 is connected to a second set input terminal of RS-FF 73 while the output terminal of NOR gate 84 is connected to a reset input terminal of RS-FF 73. The output terminal $Q_n$ of the radix-n counter 85 is connected to one input terminal of OR gate 86 and to an alarm input terminal AR of a PCV drive circuit 87. The terminal D of the sequence controller 15 is connected through an inverter 88 to an input terminal END of PCV drive circuit 87, to the other input of OR gate 86 and to the other input terminal of OR gate 74. PCV drive circuit 87 has an output terminal OUT which is connected to the terminal G through PCV (piezo-ceramic vibrator) 90. The output terminal of OR gate 86 is connected to the set input terminal S of RS-FF 70, to the reset input terminal of RS-FF 77 and to the terminal F of the sequence controller 15. The output terminal of OR gate 74 is connected to a reset terminal RESET of the radix-n counter 85.

Figure 3:
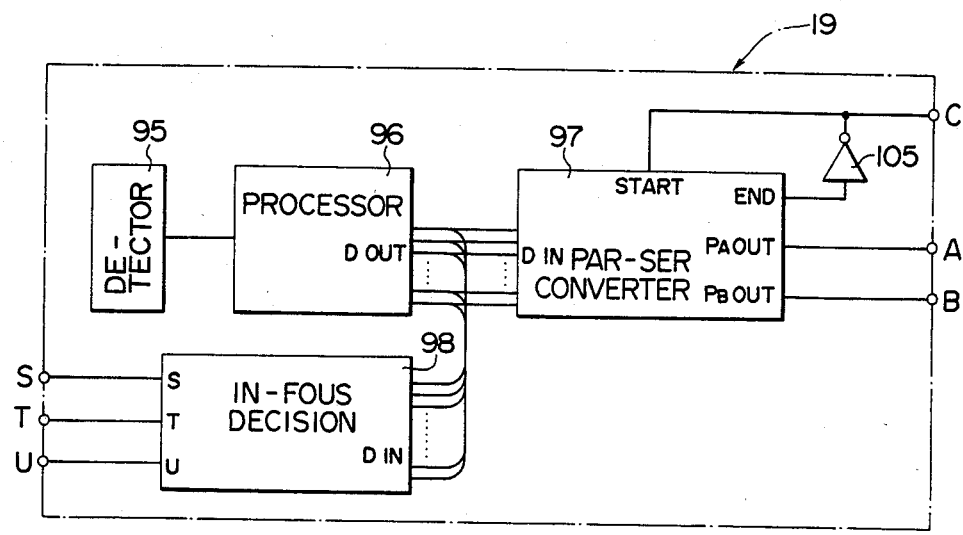
FIG. 3 is a block diagram of a focus condition detector circuit shown in FIG. 1.

FIG. 3 is a block diagram of the focus condition detector circuit 19 shown in FIG. 1. The detector circuit 19 includes a detector 95 formed by an array of photoelectric transducer elements which translate an imaging condition of light from an object being photographed which has passed through the taking lens into a corresponding electrical signal. An output from the detector 95 is fed to a processor 96. The processor 96 responds to an output from the detector 95 to produce a digital value corresponding to the magnitude of a deviation in a focus position, based on a given evaluation function. The digital value is fed through a plurality of parallel paths from output terminals DOUT to input terminals DIN of a parallel-to-serial converter 97 and an in-focus decision circuit 98, the latter driving LED's. The parallel-to-serial converter 97 has a terminal START which is connected to an output terminal C of the detector circuit 19, and also has a terminal END which is connected to the terminal C through an inverter 105 having an output terminal of open collector type. When the terminal START assumes its "H" level, the converter 97 converts a parallel digital output from the processor 96 into a serial form, which is derived as a pulse train corresponding to the magnitude of a deviation in the focus position on either output terminal $P_AOUT$ or $P_BOUT$. The output terminals $P_AOUT$, $P_BOUT$ are connected to output terminals A, B of the detector circuit 19. The in-focus decision circuit 98 determines whether an in-focus condition is reached on the basis of a digital output from the processor 96. It establishes an "L" level at its output terminal T if an in-focus condition is reached, at its output terminal S if a front focus condition is found, and at its output terminal U if a rear focus condition is found. The output terminals S, T and U of the decision circuit 98 are connected to the output terminals S, T and U of the detector circuit 19 to which LED's 23, 24 and 25, respectively, are connected.

Figure 4:
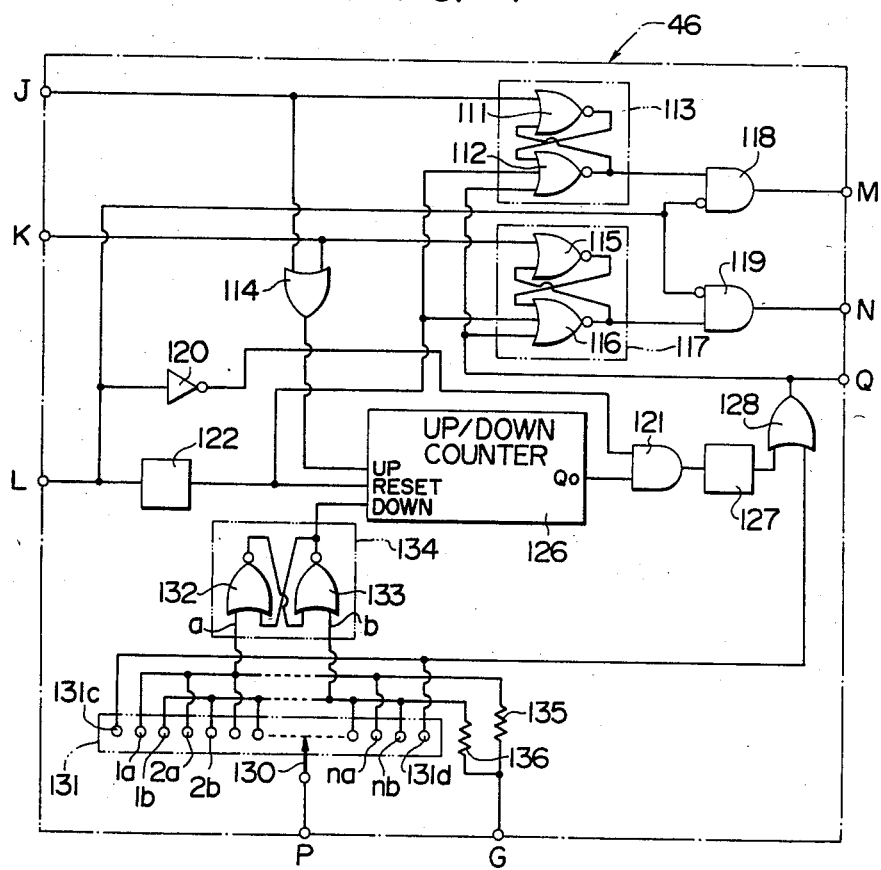
FIG. 4 is a circuit diagram of a motor drive control circuit shown in FIG. 1.

FIG. 4 is a circuit diagram of the motor drive control circuit 46 shown in FIG. 1. In this Figure, the input terminal J is connected to a set input terminal of RS-FF 113 formed by a combination of a two input NOR gate 111 and a three input NOR gate 112, and to one input terminal of OR gate 114. The input terminal K is connected to a set input terminal of RS-FF 117 formed by a combination of a two input NOR gate 115 and a three input NOR gate 116 and to the other input terminal of OR gate 114. The output terminal of RS-FF 113 is connected to one input terminal of AND gate 118, and the output terminal of RS-FF 117 is connected to one input terminal of AND gate 119. The output terminals of AND gates 118, 119 are connected to the output terminals M, N, respectively, of the motor drive control circuit 46. The other, negative logic input terminals of AND gates 118, 119 are connected to the input terminal L of the motor drive control circuit 46. The input terminal L is also connected through an inverter 120 to one input terminal of AND gate 121, and is also connected to a first reset input terminal of RS-FF's 113, 117 through a one-shot multivibrator 122. The output terminal of the multivibrator 122 is also connected to a reset terminal RESET of an up/down counter 126, an output terminal $Q_0$ of which is connected to the other input terminal of AND gate 121. The output terminal of the gate 121 is connected through another one-shot multivibrator 127 to one input terminal of OR gate 128, the output terminal of which is connected to a second reset input terminal of RS-FF's 113, 117 and to the output terminal Q of the motor drive control circuit 46.

The motor drive control circuit 46 has a power supply terminal P which is connected to a movable contact 130 which is integrally formed on a distance ring associated with a taking lens. The arrangement is such that as the distance ring rotates, the movable contact 130 moves over a pattern of electrical contacts formed on a stationary substrate 131 while making a contact therewith in a successive manner. A pair of contacts 131c and 131d located on the opposite ends of the substrate 131 are connected to the other input terminal of OR gate 128. A number of electrical contacts 1a, 1b, 2a, 2b, ... $n_a$, $n_b$ are juxtaposed on the substrate in a region between the contacts 131c and 131d. A group comprised of every other contact 1a, 2a, ... $n_a$ is connected together and connected to a set input terminal a of RS-FF 134 formed by a pair of NOR gates 132, 133, and is also connected to the ground terminal G through a resistor 135. A group comprised of the remaining, contacts 1b, 2b, ... $n_b$ is connected to a reset input terminal b of RS-FF 134, and is also connected to the ground terminal G through a resistor 136. The output terminal of RS-FF 134 is connected to a count-down input terminal DOWN of the up/down counter 126. Count-up input terminal UP of up/down counter 126 is connected to the output terminal of OR gate 114.

The operation of the automatic focussing apparatus arranged as mentioned above will now be described with reference to a series of timing charts shown in FIG. 5. Initially, when the pushbutton switch 40 disposed on the lens barrel is depressed, as indicated in FIG. 5(A), the battery 38 feeds the supply bus 47 through the switch 40, as indicated in FIG. 5(B), thus supplying power across the terminals P and G of the motor drive control circuit 46. The bus 47 also feeds the diode 17 disposed on the camera through the contact 1, whereby power is supplied across the terminals P and G of the sequence controller 15 and the focus condition detector circuit 19 which are disposed within the camera. When the bus 47 is once energized, there occurs a current flow from the bus 47 through the diode 45, resistors 44, 43 and the base-emitter path of the transistor 42 to the ground bus 37, whereby the transistor 42 is turned on. This permits a base current of the transistor 39 to flow through the resistor 41, whereby the transistor 39 is turned on. Accordingly, if the pushbutton switch 40 is subsequently turned off, the power sustain circuit formed by the transistors 42 and 39 maintains the power supply from the battery 38 through the bus 47 until the transistor 42 is turned off by an output from the sequence controller 15.

When the focus condition detector circuit 19 is energized, an output from the detector 95 which detects an imaging condition of a light image of an object being photographed is fed to the processor 96 and thence to the in-focus decision circuit 98, which establishes an "L" level on either one of the output terminals S, T or U depending on the prevailing focus condition, as indicated in FIG. 3. By way of example, FIGS. 5(N), (0) and (P) indicate that an "L" level is established on the output terminal S for a front focus condition, on the output terminal T for an in-focus condition and on the output terminal U for a rear focus condition, respectively. One of the display LED's 23, 24, 25 is energized to indicate a focus condition to the user. If an in-focus condition is not achieved, LED 23 will be illuminated for a front focus condition while LED 25 will be illuminated for a rear focus condition.

When the sequence controller 15 is energized, there occurs a current flow through the resistor 61 and capacitor 62 (see FIG. 2), whereby the capacitor 62 is charged to allow the power on reset circuit 63 to produce a reset pulse of a short duration, as indicated in FIG. 5(C), which pulse is applied to the reset input terminal R of RS-FF 70 and to the clock terminal CLK of D-FF 69. When RS-FF 70 is reset, its output terminal $Q_2$ assumes its "L" level, and accordingly the negative logic input terminal of AND gate 80 assumes its "L" level. D-FF 69 monitors the level at the input terminal H of the sequence controller 15 which is applied to the input terminal DATA thereof, and stores the level prevailing at the input terminal H at the time the reset pulse applied to the clock terminal CLK rises and outputs such level at the output terminal $Q_1$ of D-FF 69. The input terminal H is connected to the junction between the pushbutton switch 10 and resistor 22, both disposed within the camera, externally of the sequence controller 15. Since the pushbutton switch 10 remains off at this time, the input terminal H assumes its "L" level. Thus, the output terminal $Q_1$ of D-FF 69 assumes its "L" level and consequently the output terminal E assumes its "L" level. In other words, the sequence controller 15 detects that the pushbutton switch 10 is turned off if the input terminal H assumes its "L" level, and maintains the output terminal E at the same "L" level. Since the output terminal E assumes its "L" level, the transistor 12 which is connected to this terminal through resistor 14 externally of the sequence controller 15 is maintained off, preventing the power sustain circuit from operating to feed from the battery 8 located within the camera.

The reset pulse from the reset circuit 63 is fed through OR gate 74 to the reset terminal RESET of the radix-n counter 85, which is therefore reset, with its output terminal $Q_n$ assuming an "L" level. The reset pulse is also applied to the first set input terminal of RS-FF's 73 and 77, whose outputs will both be at their "H" level. Accordingly, AND gate 81 produces an output of "H" level, whereby the terminal V which is connected to this output through resistor 82 assumes its "H" level, as indicated in FIG. 5(D). The "H" level at the terminal V is applied to the terminal C of the focus condition detector circuit 19, so that the terminal START of the parallel-to-serial converter 97 assumes an "H" level, as will be noted from FIG. 3. Thereupon, the converter 97 converts digital information concerning a focus condition which is derived from the processor 96 from parallel into serial form, outputting a train of pulses, the number of which corresponds to the magnitude of a deviation in the focus position, on either the output terminal $P_A$OUT (output terminal A) or output terminal $P_B$OUT (output terminal B) in a manner corresponding to the direction of such deviation. Specifically, when the reset pulse causes the terminal V to assume an "H" level, a pulse train corresponding to the magnitude of a deviation will be produced at the output terminal A of the detector circuit 19, as indicated in FIG. 5(F), if a front focus prevails. The pulse train is applied to the input terminal J of the motor drive control circuit 46. Conversely, for a rear focus, a pulse train corresponding to the magnitude of a deviation representing the rear focus will be produced on the output terminal B of the detector circuit 19, as indicated in FIG. 5(G), and applied to the input terminal K of the control circuit 46.

On the other hand, when the terminal V of the sequence controller 15 assumes its "H" level, the input terminal L of the motor drive control circuit 46 which is disposed within the lens barrel and which is connected to the terminal V through the contact 5 assumes its "H" level, and its leading edge causes the multivibrator 122 to produce a reset pulse as shown in FIG. 5(E). This reset pulse is applied to the first reset input terminal of RS-FF's 113, 117 and to the reset terminal RESET of the up/down counter 126. This resets the counter 126. When the pulse train corresponding to the deviation in the focus position is applied to either input terminal J or K subsequently, it is fed to the count-up input terminal UP of the counter 126 through OR gate 114, whereby the pulses in the train are counted. When the counter 126 initiates its counting operation, its output terminal $Q_0$ assumes an "L" level, so that the output from OR gate 128 is at its "L" level unless the movable contact 130 on the distance ring engages either end contact 131c, 131d. Hence RS-FF 113 or RS-FF 117 is set in response to the pulse train. Thus, an output from RS-FF 113 or 117 assumes its "H" level at the time when the pulse train is applied from either output A or B of the focus condition detector circuit 19 to either input terminal J or K of the motor drive control circuit 46. However since now "H" level is supplied from the input terminal L to the negative logic input terminal of AND gates 118, 119, the output of the latter or the level at the output terminals M, N remains at its "L" level.

When the focus condition detector circuit 29 completes delivering a pulse train representing the magnitude of a deviation in the focus position from either output terminal A or B, the terminal END of the parallel-to-serial converter 97 therein assumes its "H" level for a short interval, which level is fed through the inverter 105 to force the terminal C to assume its "L" level. This causes the terminal V of the sequence controller 15 to assume its "L" level. Since the output terminal Q of the control circuit 46 also assumes an "L" level, the reset terminal R of the sequence controller 15 assumes an "L" level. Accordingly, NOR gate 84 produces an output of "H" level. This resets RS-FF 73, producing an output of "L" level. Accordingly, AND gate 81 produces an output of "L" level, whereby the output terminal V continues to maintain the "L" level.

The "L" level at the terminal V is applied to the negative logic input terminal of AND gate 118 or 119, which therefore passes the output of RS-FF 113 or 117 which assumes an "H" level in response to the pulse train, to the output terminal M or N, as indicated in FIG. 5(H) or (I), respectively. The "L" level at the terminal L is inverted into an "H" level by the inverter 120 to be fed to one input terminal of AND gate 121, which then waits for the output terminal $Q_0$ of the up-/down counter 126 assume an "H" level.

When either output terminal M or N of the motor drive control circuit 46 assumes its "H" level, this output causes a drive current to flow through the motor 56 in a direction indicated by an arrow $a_0$ or $b_0$, as indicated in FIG. 1, causing the taking lens to move. Specifically, if the output terminal M assumes an "H" level, the transistor 48 is turned on, as are the transistors 50 and 54. As a result, there occurs a flow of drive current from the battery 38 in the direction of the arrow $a_0$ through a path including transistor 50, motor 56 and transistor 54. This current flow allows the motor 56 to rotate the distance ring in a direction to move the taking lens from a position representing a front focus toward the in-focus position. Conversely, if the output terminal N assumes an "H" level, the transistor 49 is turned on as are the transistors 51 and 55. As a result, there occurs a flow of drive current from the battery 38 through a path including the transistor 51, motor 56 and transistor 55, in the direction of the arrow $b_0$. This allows the motor 56 to rotate the distance ring in a direction to cause a movement of the taking lens from a position representing a rear focus toward the in-focus position.

As the distance ring rotates by a drive from the motor 56, the movable contact 130 which is integral with the distance ring moves over the pattern of electrical contacts formed on the stationary substrate 131. During a movement of the movable contact 130, it successively engages the sequence of electrical contacts $1a$, $1b$, $2a$, $2b$, . . . $n_a$, $n_b$ in the order named or in the opposite direction from a given position. When the movable contact 130 engages the electrical contacts $1a$, $2a$, . . . $n_a$, a pulse of "H" level is applied to the set input terminal a of RS-FF 134, as indicated in FIG. 5(J). When the movable contact 130 engages the electrical contacts $1b$, $2b$, . . . $n_b$, a pulse of "H" level is applied to the reset input terminal b of RS-FF 134, as indicated in FIG. 5(K). Thus, the input terminals a and b alternately assume an "H" level, whereby pulses as shown in FIG. 5(L) are fed from RS-FF 134 to the count-down input terminal DOWN of the up/down counter 126. As such pulses are applied one by one to the input terminal DOWN, the counter 126 counts down beginning from a count which is supplied through the input terminal UP. When a number of pulses which is equal in number to the initial count supplied through the input terminal UP are counted, the output terminal $Q_0$ of the counter 126 assumes an "H" level, whereupon the "H" level is passed through AND gate 121 to the multivibrator 127. In response thereto, the multivibrator 127 produces a pulse of "H" level which has a short duration in coincidence with the leading edge of an output from AND gate 121. The pulse of "H" level passes through OR gate 128 to be applied to the second reset input terminals of RS-FF's 113, 117, thus resetting either RS-FF which has been set by the pulse train from the detector circuit 19, causing their output to revert to an "L" level. Accordingly, one of the output terminals M, N which has been maintained at the "H" level changes to its "L" level, whereby either the transistors 48, 50 and 54 or the transistors 49, 51 and 55 are turned off to cease the energization of the motor 56, thus stopping the movement of the taking lens. At the same time, the "H" level output pulse of short duration which is produced by the multivibrator 127 passes through OR gate 128 to be delivered to the reset terminal R of the sequence controller, located within the camera, from the output terminal Q of the motor drive control circuit 46. Since the terminal V now assumes an "L" level, AND gate 83 produces an output of "H" level while NOR gate 84 produces an output of "L" level. Accordingly, RS-FF 73 is set and its output of "H" level is fed through AND gate 81 to change the terminal V to its "H" level. Thus, after the terminal V of the sequence controller 15 changes to its "L" level, one cycle of focussing operations including a series of distance adjustments toward the in-focus point terminates when the terminal R resumes its "H" level, whereupon the terminal V resumes its "H" level. This cycle is counted by the radix-n counter 85.

When the terminal V resumes its "H" level, the parallel-to-serial converter 97 has its terminal START changed to its "H" level as a result of the terminal C of the detector circuit 19 which is connected to the terminal V, and thus the detector circuit 19 again produces a pulse train corresponding to an imaging condition on either output terminal A or B. Subsequently, a series of focussing operations to achieve an in-focus condition is repeated as mentioned above. The number of repetitions of such series of operations is counted by the radix-n counter 85 within the sequence controller 15.

Figure 5:
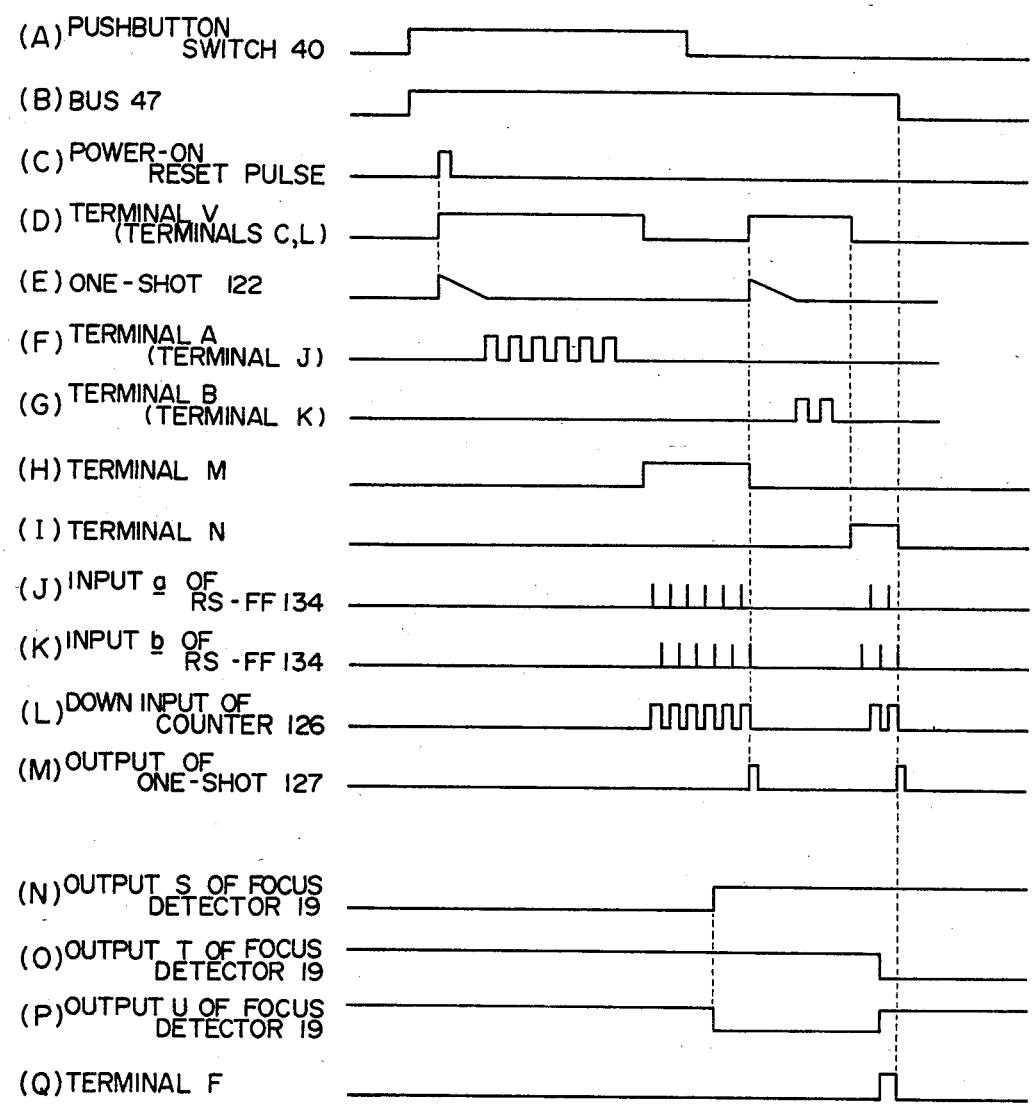
FIGS. 5(A) to (Q) are a series of timing charts illustrating the operation of various parts of the apparatus.

As the series of focussing operations are repeated, and an in-focus condition is reached before the radix-n counter 85 steps to the given count n, the output terminal T of the in-focus decision circuit 98 within the focus condition detector circuit 19 changes to its "L" level, as indicated in FIG. 5(0), whereby LED 24 within the finder is illuminated. The "L" level is also applied to the input terminal D of the sequence controller 15, and is fed through the inverter 88 to be applied to the input terminal END of PCV drive circuit 87 as an "H" level, whereby the drive circuit 87 operates in its first mode to activate PCV 90 to produce a brief "PEEP" sound, indicating to a user that the in-focus condition is reached. At this time, OR gates 74, 86 produce an output of "H" level, which resets the radix-n counter 85 and which causes the terminal F to resume its "H" level, as indicated in FIG. 5(Q).

If an object being photographed moves too rapidly to allow the taking lens to follow such movement and accordingly an in-focus condition is not reached when the counter 85 has stepped to the given count, the output terminal $Q_n$ of the counter 85 assumes an "H" level, which is applied to the alarm input terminal AR of the PCV drive circuit 87, causing the latter to operate in a second mode in which PCV 90 is driven to produce a long "PEEP" sound, indicating to a user that a distance adjustment toward an in-focus position is impossible. The output of the counter 85 is also fed through OR gate 86 to change the terminal F to its "H" level.

As mentioned above a series of focussing operations result in an in-focus condition either being reached or not reached, and the terminal F of the sequence controller 15 assumes its "H" level. Thereupon, the transistor 21 is turned on, whereby a current path is closed from the bus 47 through the diode 45, resistor 44, contact 2 and transistor 21, thus ceasing to supply a base current to the transistor 42, which is therefore turned off as is the transistor 39. Accordingly, unless the pushbutton switch 40 remains on, the connection between the bus 47 and the battery 38 is interrupted, and the sequence controller 15, the focus condition detector circuit 19 and the motor drive control circuit 46 are no longer energized. In this manner, the circuit which is used for the focussing operation is deenergized at the same time as the series of focussing operations terminate.

If the pushbutton switch 40 remains on, the sequence controller 15, the detector circuit 19 and the control circuit 46 continue to be energized through the switch 40 even after the terminal F assumes its "H" level. The radix-n counter 85 is reset when an in-focus condition is reached if it does not advance to the given count n. Alternatively, if the arrangement fails to reach an in-focus condition, the counter is reset after it has advanced to the given count. When the "H" level is applied to the terminal R from the terminal Q and the terminal V assumes its "H" level, the sequence controller 15 returns to its initial condition, again initiating a series of focussing operations. In other words, if the pushbutton switch 40 continues to be depressed, a series of focussing operations are repeated even after the terminal F assumes its "H" level, whereby the taking lens attempts to catch an object being photographed in focus in a successive series of focussing operations when the object or the camera is moving, for example.

It will be seen from the foregoing that when the pushbutton switch 40 on the lens barrel is turned on, the sequence controller 15 and the focus condition detector circuit 19 disposed within the camera as well as the motor drive control circuit 46 disposed within the lens barrel are fed from the battery 38 which is disposed within the lens barrel, allowing them to perform a focussing operation. If the battery 8 disposed within the camera is exhausted or no such battery is present within the camera, proper operation is still assured. It will be noted that the photometry/exposure control circuit 26 disposed within the camera is also fed from the battery 38, and therefore the shutter of the camera is controlled to provide a proper amount of exposure after the series of focussing operations are completed, by depressing a shutter release button subsequent to the operation of the pushbutton switch 40.

Considering the pushbutton switch 10 on the camera, it is to be noted that this switch is mechanically interlocked with a shutter release button and is turned on during a first stroke of depression of the shutter release button. When the switch 10 is closed, the sequence controller 15 and the detector circuit 19 are energized from the battery 8 within the camera through the switch 10 and the diode 16. When the sequence controller 15 is energized, an output pulse from the power on reset circuit 63 is applied to D-FF 69, as mentioned previously, and the level on the input terminal H is delivered to the output terminal E. Specifically, the input terminal H assumes an "H" level as the pushbutton switch 10 is turned on, and the "H" level is applied to one input terminal of AND gate 80 through D-FF 69. Since RS-FF 70 is reset by the power on reset pulse, the other, negative logic input terminal of AND gate 80 assumes its "L" level. Accordingly, the output terminal E assumes an "H" level. This allows a base current to be supplied through the resistor 14 to the transistor 12, which is therefore turned on, as is the transistor 9. Accordingly, if the pushbutton switch 10 is subsequently opened, the power sustain circuit formed by the transistors 12 and 9 maintains a power supply to the sequence controller 15 and the focus condition detector circuit 19 from the battery 8 through the transistor 9 and the diode 16. When the terminal E assumes an "H" level, a base current is supplied to the transistor 42 disposed within the lens barrel through the diode 20 and resistor 43, turning it on. This allows the transistor 39 to be turned on, and therefore if the pushbutton switch 40 mounted on the lens barrel is not depressed, the bus 47 is energized from the battery 38. Accordingly, the motor drive control circuit 46 is energized, and the bus 47 also energizes the sequence controller 15 and the focus condition detector circuit 19 through the diode 17. In other words, while the motor drive control circuit 46 is energized from the battery 38, both the sequence controller 15 and the detector circuit 19 are energized through the junction 18 from either battery 8 or 38, whichever supplies a higher voltage.

Subsequently, the operation is performed in the same manner as mentioned before, successively moving the taking lens toward an in-focus position. If an in-focus condition is reached with a number of drives which is less than the count determined by the radix-n counter 85, or if it is determined that a distance adjustment is impossible when the given count of drives has been tried, OR gate 86 within the sequence controller 15 produces an output of "H" level to change the terminal F to its "H" level while simultaneously setting RS-FF 70. Thus, the negative logic input terminal of AND gate 80 assumes an "H" level, whereby its output terminal E assumes an "L" level. The "H" level on the terminal F and the "L" level on the terminal E make the transistor 21 conductive and make the transistor 42 turn off, which causes the transistor 39 to be turned off, thus interrupting the connection between the bus 47 and the battery 38. Accordingly, the motor drive control circuit 46 is no longer energized, and at the same time, the power supply to the sequence controller 15 and the focus condition detector circuit 19 through the diode 17 is interrupted.

The "L" level on the output terminal E turns the transistor 12 off, followed by turn-off of the transistor 9, thus deactivating the power sustain circuit formed by these transistors. If the pushbutton switch 10 does not remain closed at this time, the connection between the battery 8 and the diode 16 is interrupted, whereby the sequence controller 15 and the focus condition detector circuit 19 are no longer fed from the battery 8. If the pushbutton switch 10 continues to be depressed, the sequence controller 15 and the focus condition detector circuit 19 continue to be energized even after the terminal E assumes its "L" level and the terminal F assumes its "H" level. However, at this time, the "H" level on both terminals E and F causes AND gate 81 to produce an output of "L" level, which causes the terminal V of the sequence controller 15 to assume an "L" level, whereby the terminal C of the detector circuit 19 assumes an "L" level, preventing the detector circuit from producing a pulse train on either output terminal A or B. However, a signal of "L" level indicating a focus condition is delivered to one of the output terminals S, T and U, allowing one of the LED's 23 to 25 to provide a display within the finder until the pushbutton switch 10 is turned off. If the in-focus condition is reached, the shutter release button may be depressed to its second stroke, allowing a shutter release operation to take place. Thereupon, the photometry/exposure control circuit 26 operates, controlling the shutter of the camera to provide a proper amount of exposure.

Figure 6:
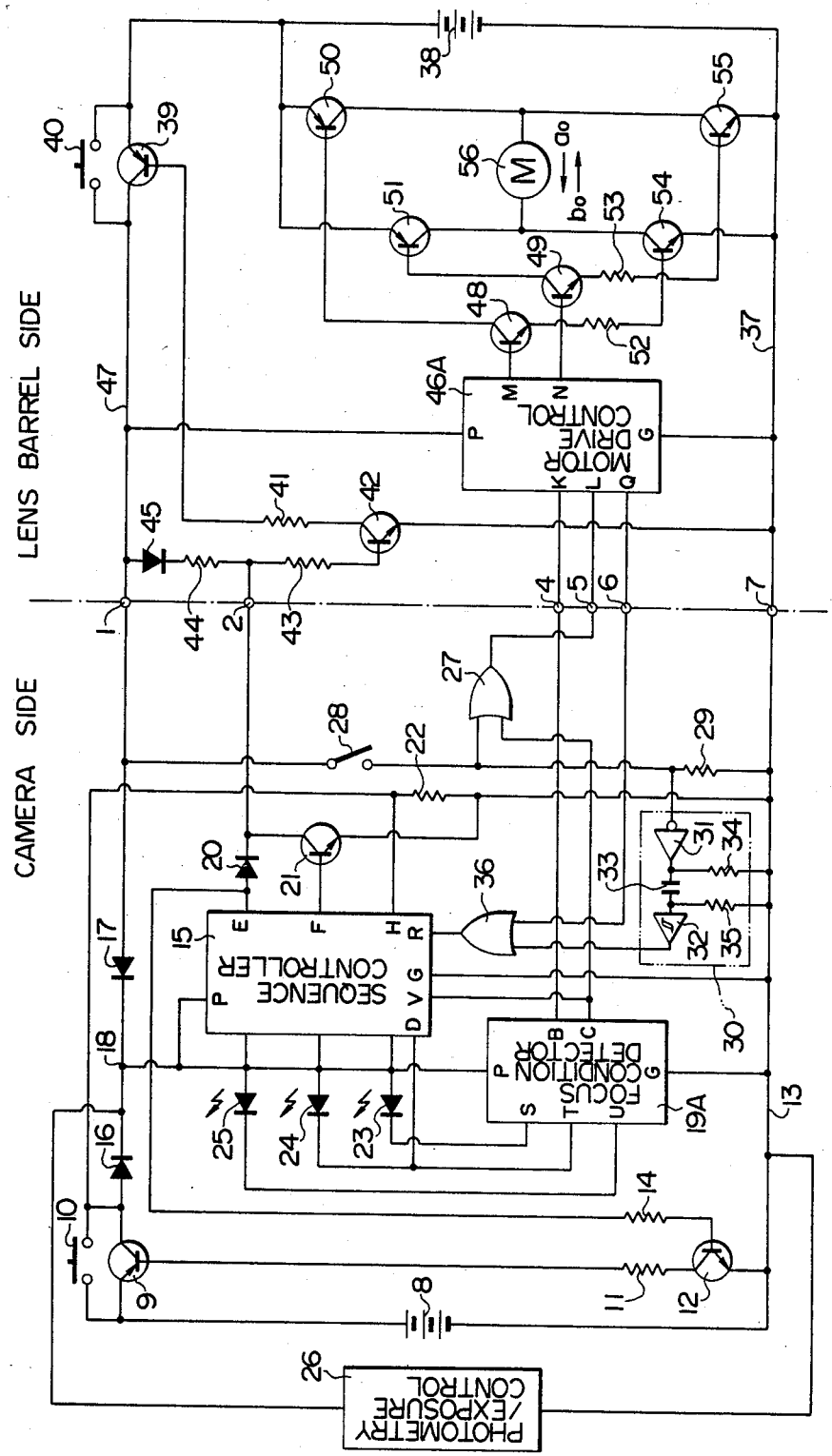
FIG. 6 is a circuit diagram of an automatic focussing apparatus according to another embodiment of the invention.

FIG. 6 is a circuit diagram of an automatic focussing apparatus according to another embodiment of the invention. The apparatus shown in FIG. 6 is constructed in a manner generally similar to the apparatus shown in FIG. 1, and hence parts corresponding to those shown in FIG. 1 are designated by like reference characters without repeating their description. Accordingly, the following description is directed to that portion of the apparatus which is different in arrangement from that shown before. In this embodiment, the number of contacts formed on the mounting surfaces of the camera and the lens barrel is reduced by one from the previous embodiment, or six in number. Specifically, a focus condition detector circuit 19A of this embodiment is devoid of an output terminal which corresponds to the output terminal A of the detector circuit 19 shown in the previous embodiment. Also, a motor drive control circuit 46A of this embodiment is devoid of an input terminal which corresponds to the input terminal J of the motor drive control circuit 46 shown in FIG. 1. Accordingly, the contact 3 which provides an interface between the output terminal A and the input terminal J is omitted.

The focus condition detector circuit 19A has an output terminal B connected to an electrical contact 4 which is in turn connected to a terminal K of motor drive control circuit 46A. The detector circuit 19A also has a terminal C connected to one input terminal of OR gate 27, the output of which is connected to an electrical contact 5 which is in turn connected to a terminal L of the motor drive control circuit 46A. The other input terminal of OR gate 27 is connected to the junction between a switch 28 and a resistor 29 which are connected in series between the anode of the diode 17 and the ground bus 13. The switch 28 is mechanically interlocked with a release operation and is closed during a second stroke of depression of a shutter release button. The junction between the switch 28 and resistor 29 is also connected to an input circuit of a reset circuit 30. The reset circuit 30 comprises an inverter 31 disposed at the input end thereof, a schmitt trigger inverter 32 disposed at the output end thereof, a capacitor 33 connected between the two inverters, and a pair of resistors 34, 35 each having one end connected to each of the opposite ends of the capacitor 33 and the other end connected to the ground bus 13. The output terminal of the reset circuit 30 is connected to one input terminal of OR gate 36, the output of which is connected to the reset terminal R of the sequence controller 15. The other input terminal of OR gate 36 is connected to an electrical contact 6 which is in turn connected to a terminal Q of the motor drive control circuit 46A.

Figure 7:
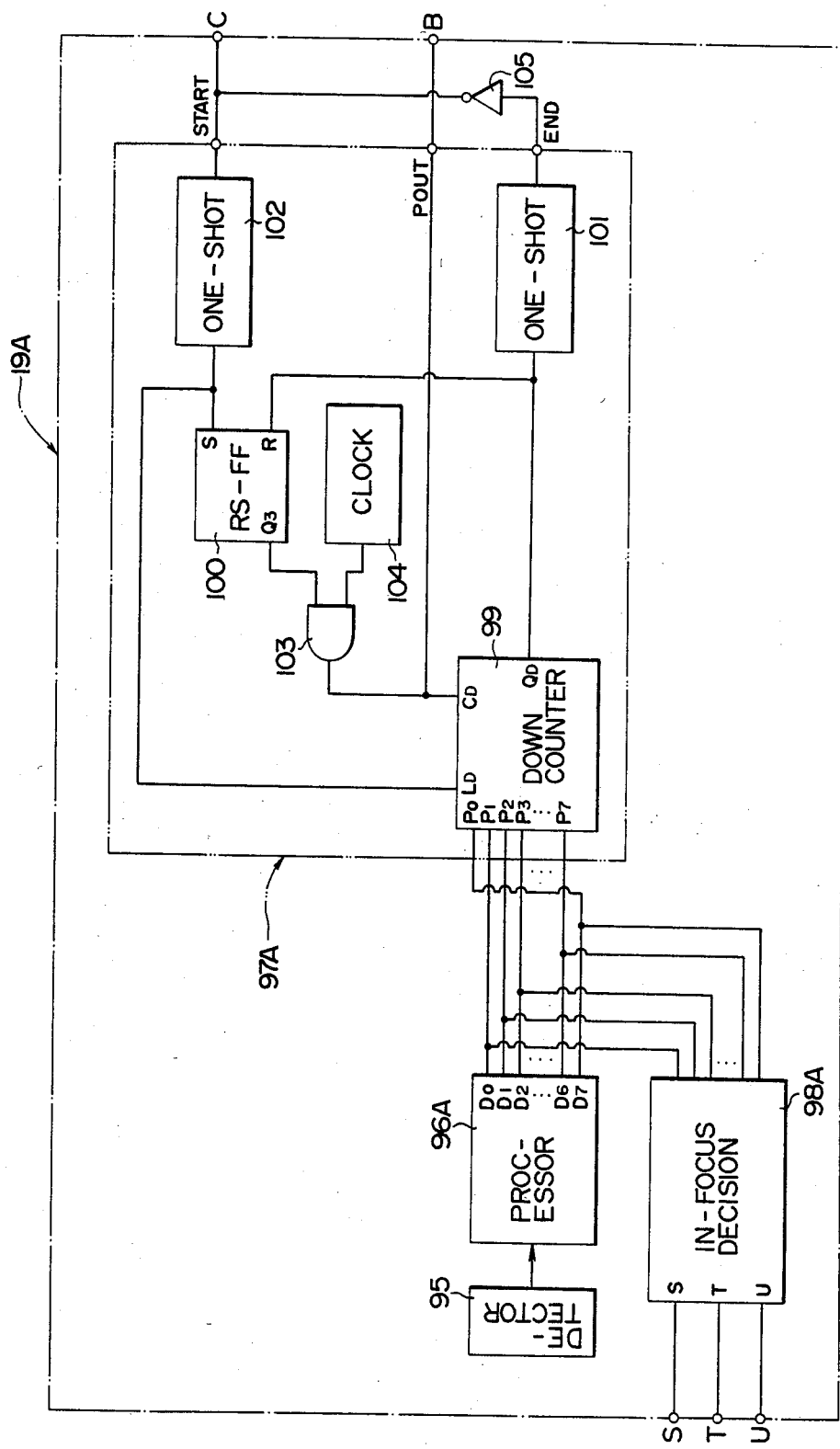
FIG. 7 is a circuit diagram of a focus condition detector circuit shown in FIG. 6.

FIG. 7 is a block diagram of the detector circuit 19A shown in FIG. 6. It includes a processor 96A which processes an output from a detector 95 in accordance with a given evaluation function, and delivers information representing the magnitude and the direction of a deviation in the focus position to a parallel-to-serial converter 97A and an in-focus decision circuit 98A which operates to drive LED's. Specifically, the processor 96A has output terminals $D_0$ to $D_7$ on which information relating to the focus condition is delivered. A digital 7-bit signal indicating the magnitude of a deviation in the focus position is conveyed through terminals $D_0$ to $D_6$ with the least significant digit on the terminal $D_0$ and the most significant digit on the terminal $D_6$ while the terminal $D_7$ conveys a signal indicative of the direction of such deviation and which will be at its "L" level for a front focus condition or at its "H" level for a rear focus condition.

The converter 97A includes a down counter 99 having an input terminal $P_0$, to which the output terminal $D_7$ of the processor 96A is connected. The counter 99 also has input terminals $P_1$ to $P_7$, to which the output terminals $D_0$ to $D_6$, respectively, are connected. The counter 99 is a presettable down counter, which operates to load data supplied to its input terminals $P_0$ to $P_7$ in response to a leading edge of a signal applied to its terminal $L_D$, and subsequently counts down from this data in response to a pulse applied to its terminal $C_D$, and establishes an "H" level at its output terminal $Q_D$ when it has counted down to zero. The output terminal $Q_D$ of the counter 99 is connected to a reset terminal R of RS-FF 100 and is also connected to a terminal END of the converter 97A through a one-shot multivibrator 101. The converter 97A has a terminal START which is connected to a set terminal S of RS-FF 100 through a one-shot multivibrator 102, the output terminal of which is also connected to the terminal $L_D$ of the counter 99. RS-FF 100 has an output terminal $Q_3$ which is connected to one input terminal of AND gate 103, the other input terminal of which is connected to a clock generator 104 which produces clock pulses during a given period. The output terminal of AND gate 103 is connected to the terminal $C_D$ of the counter 99 and is also connected to a terminal POUT, which represents the output terminal of the converter 97A.

The terminal START of the converter 97A is connected to the terminal C of the detector circuit 19A while the terminal END is connected to the terminal C through an inverter 105 which is provided externally of the converter. The converter 97A operates to convert a digital input signal supplied in parallel form from the processor 96A into a serial form to be delivered in the form of a pulse train through the output terminal POUT when the terminal START assumes an "H" level. It is to be noted that for a figure $\alpha$ representing the magnitude of a deviation in the focus position, the pulse train comprises a number of pulses which are equal to $2\alpha$ for a front focus condition, and comprises $(2\alpha+1)$ pulses for a rear focus condition. The output terminal POUT of the converter 97A is connected to the terminal B of the detector circuit 19A. The in-focus decision circuit 98A determines whether an in-focus condition is reached, based on a digital output from the processor 96A, and produces an "L" level at an output terminal T for an in-focus condition, at an output terminal S for a front focus condition and at an output terminal U for a rear focus condition. It will be understood that these output terminals S, T, U of the decision circuit 98A are directly connected to the terminals S, T, U, respectively, of the detector circuit 19A to which LED's 23, 24, and 25 are connected.

Figure 8:
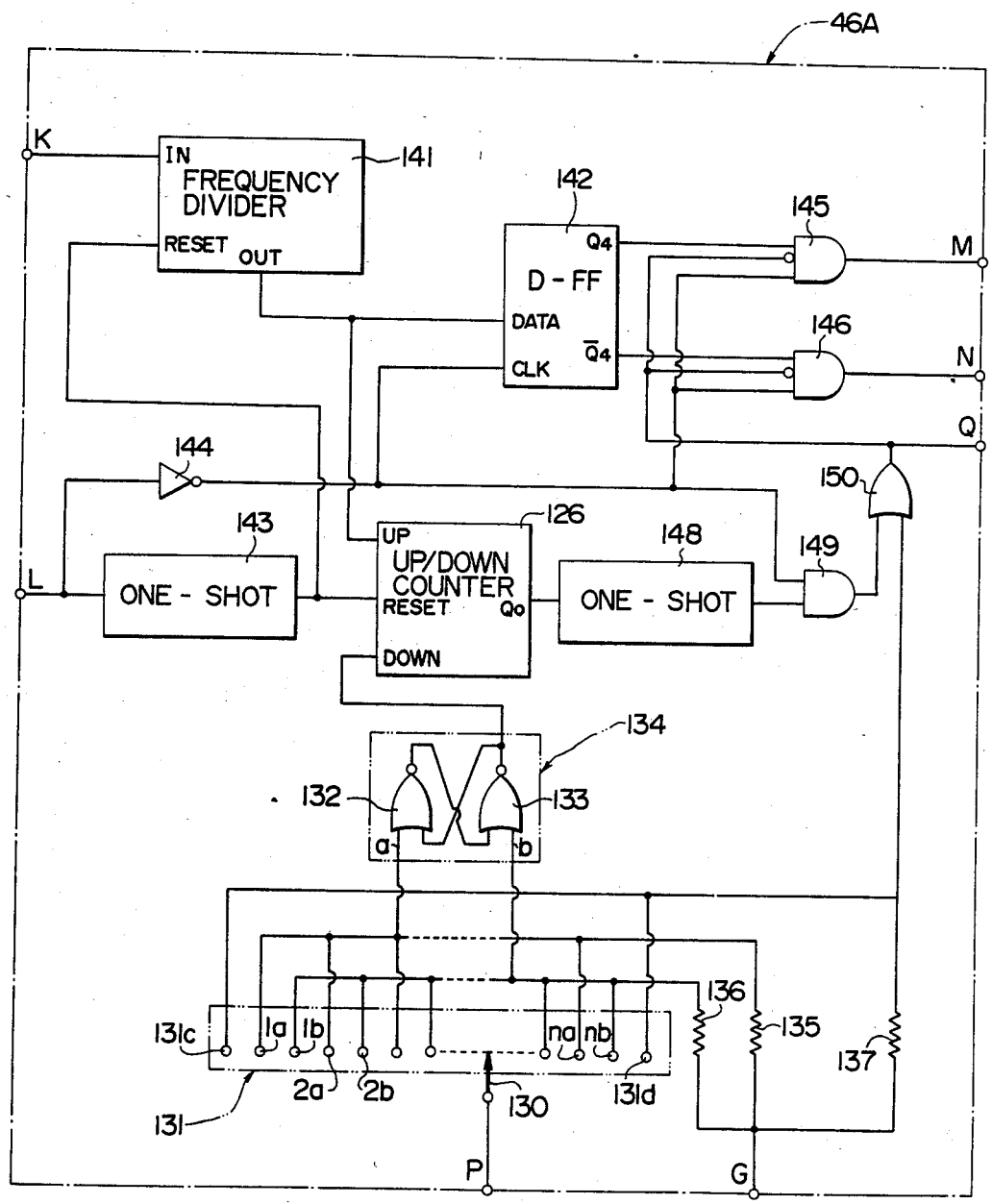
FIG. 8 is a circuit diagram of a motor drive control circuit shown in FIG. 6.

FIG. 8 is a circuit diagram of the motor drive control circuit 46A shown in FIG. 6. In FIG. 8, the control circuit 46A includes a terminal K which is connected to an input terminal IN of a frequency divider 141 which divides the frequency of pulses supplied through the terminal K by two. The frequency divider 141 has an output terminal OUT connected to an input terminal DATA of D-FF 142 and to a count-up input terminal UP of an up/down counter 126. The frequency divider 141 has a reset terminal RESET which is connected to an output terminal of a one-shot multivibrator 143 which is in turn connected to a terminal L of the motor drive control circuit 46A. D-FF 142 has a clock terminal CLK, to which the terminal L is connected through an inverter 144. D-FF 142 has an output terminal $Q_4$ connected to a first input terminal of a three input AND gate 145 and also has an inverted output terminal $\overline{Q_4}$ connected to a first input terminal of a three input AND gate 146. The output terminals of the gates 145, 146 are connected to the terminals M, N, respectively, of the motor drive control circuit 46A. The output terminal of the multivibrator 143 is connected to a reset terminal RESET of the counter 126, the output terminal $Q_0$ of which is connected to one input terminal of AND gate 149 through a one-shot multivibrator 148. The other input terminal of the gate 149 is connected to the output terminal of the inverter 144. The output terminal of the gate 149 is connected to one input terminal of OR gate 150, the output terminal of which is connected to the negative logic input terminal of the gates 145, 146 and to the terminal Q of the motor drive control circuit 46A. The gates 145, 146 also have a third input terminal connected to the output terminal of the inverter 144. A circuit portion connected between the count-down input terminal DOWN of the counter 126 and the power supply terminal P and the ground terminal G of the motor drive control circuit 46A for producing pulses in response to a rotation of a distance ring associated with a taking lens is contructed in a manner similar to that shown and described above in connection with the motor drive control circuit 46 illustrated in FIG. 4. It is also to be noted that a resistor 137 is connected between the other input of the gate 150 and the ground terminal G.

The operation of the automatic focussing apparatus described above will now be described with reference to a series of timing charts shown in FIGS. 9(A) to (R). However, it is to be noted that the subsequent description is directed to a principal difference over the operation of the apparatus shown in FIG. 1. Initially, when the pushbutton switch 40 on the lens barrel is closed, the power sustain circuit formed by the transistors 42 and 39 function to feed the sequence controller 15, the focus condition detector circuit 19A and the motor drive control circuit 46A from the battery 38 through the supply bus 47. An operation takes place in a manner similar to that mentioned previously, and the terminal V of the sequence controller 15 assumes an "H" level. This level is applied to the terminal C of the focus condition detector circuit 19A, whereby the terminal START of the parallel-to-serial converter 97A shown in FIG. 7 changes to its "H" level. In response to the leading edge of the level change at the terminal START, the multivibrator 102 produces a pulse of "H" level having a short duration, thus setting RS-FF 100 and also feeding an output pulse to the terminal $L_D$ of the down counter 99.

Assuming that a decimal number having $\alpha = 3$ which is indicative of the magnitude of a deviation in the focus position of an image corresponding to an object being photographed is supplied to the input terminals $P_1$ to $P_7$ of the down counter 99 and that a signal of "H" level, representing a rear focus, is applied to the input terminal $P_0$ indicative of the direction of deviation in the focus position, it will be seen that the counter 99 has a preset value of $V_F = 2 \times 3 + 1 = 7$ at the time the pulse of "H" level is applied to the terminal $L_D$. Since RS-FF 100 produces an "H" level at its output terminal $Q_3$ when it is set, the clock pulse produced by the clock generator 104 is fed through AND gate 103 and applied to the terminal $C_D$ of the counter 99. The counter 99 counts down from the preset value of $V_F = 7$ until the count therein becomes equal to 0, whereupon the output terminal $Q_D$ assumes an "H" level. This occurs in response to the trailing edge of the seventh clock pulse. The signal of "H" level is fed to RS-FF 100 to reset it, whereupon the terminal $C_D$ of the counter 99 ceases to change its level and the output terminal $Q_D$ of the counter 99 assumes an "L" level. In this manner, a pulse train (see FIG. 9(F)) having seven pulses which are equal in number to those applied to the terminal $C_D$ is delivered from the output terminal POUT of the converter 97A to the terminal B of the focus condition detector circuit 19A.

By way of another example, if it is assumed that information representing a deviation in the focus position with $\alpha = 1$ is applied to the input terminals $P_1$ to $P_7$ of the down counter 99 and the signal of "L" level, indicating a front focus, is applied to the input terminal $P_0$, the counter 99 has a preset value of $V_F = 2 \times 1 = 2$ at the time the pulse of "H" level is applied to the terminal $L_D$. Subsequently, as the down counter counts down in response to clock pulses fed through AND gate 103 to the terminal $C_D$, a pulse train (see FIG. 9(F)) having two pulses is delivered to the terminal B of the focus condition detector circuit 19A. Thus it will be seen that a single pulse train contains information representing both the magnitude and the direction of a deviation in the focus position, which information is available from the single terminal B, and is fed through the contact 4 located at the interface between the camera and the lens barrel or through a single signal path, to the terminal K of the motor drive control circuit 46A.

On the other hand, when the terminal V of the sequence controller 15 assumes an "H" level, it is fed through OR gate 27 and the contact 5 to the terminal L of the motor drive control circuit 46A disposed within the lens barrel, and its leading edge triggers the multivibrator 143, which then produces a reset pulse shown in FIG. 9(E). The reset pulse is applied to the reset terminals RESET of the frequency divider 141 and the up/down counter 126, whereby the counter 126 is reset. Subsequently, when the pulse train (FIG. 9(F)) representing the magnitude and the direction of a deviation in the focus position is applied to the terminal K, it is fed to the frequency divider 141, whereupon the pulse train is frequency divided by a factor of two. The output pulse from the frequency divider 141 is fed to the count-up input terminal UP of the counter 126 so as to be counted thereby. If the counter 126 has initiated its counting operation, the output from the gate $Q_0$ remains at its "L" level as does the output of AND gate 149. Accordingly, the output from the gate 150 is at its "L" level unless the movable contact 130 on the distance ring engages either end contact 131c or 131d, and hence the negative logic input terminal of the gates 145, 146 and the terminal Q of the motor drive control circuit 46A remain at their "L" level. The output pulse from the frequency divider 141 is also fed to D-FF 142 or to the input terminal DATA thereof, but D-FF 142 does not store the level of such output pulse since the terminal V assumes an "H" level and hence the clock terminal CLK of D-FF 142 is at its "L" level as long as the frequency divider 141 successively delivers frequency divided pulses. The signals applied to either terminal M, N from either gate 145, 146 remains at its "L" level as long as the terminal V assumes its "H" level, the transistors 48 to 55 are turned off and the motor 56 remains at rest.

When the detector circuit 19A completes delivering out a pulse train representing the magnitude and the direction of a deviation in the focus position through the terminal B thereof, the output terminal $Q_D$ of the down counter 99 therein assumes its "H" level, the leading edge of which causes the multivibrator 101 to produce a pulse of "H" level. Thus, the terminal END of the converter 97A temporarily assumes an "H" level, which is fed through the inverter 105 to force the terminal C to assume an "L" level. This causes the terminal V of the sequence controller 15 to assume an "L" level also. Since the terminal Q of the control circuit 46A also assumes an "L" level, the reset terminal R of the sequence controller 15 is at its "L" level, and hence the output from NOR gate 84 is an "H" level. This resets RS-FF 73, the output of which will be an "L" level as is the output from the AND gate 81, whereby the output terminal V continuously maintains an "L" level.

When the terminal V assumes an "L" level, all of the gates 145, 146 and 149 receive an "H" level and simultaneously the clock terminal CLK of D-FF 142 also changes to its "H" level. It will be seen that the number of pulses in the pulse train supplied to the frequency divider 141 from the terminal B of the detector circuit 19A is equal to an odd number $(2\alpha+1)$ for a rear focus condition and will be equal to an even number $(2\alpha)$ for a front focus condition, as indicated in FIG. 9(F), so that when the pulse train has been delivered, the output from the frequency divider 141 will be at its "H" level for a rear focus condition and will be at its "L" level for a front focus condition, as shown in FIG. 9(G). When the clock terminal CLK of D-FF 142 changes to its "H" level, the signal level at the input terminal DATA is stored, and accordingly, when the terminal V changes to its "L" level, D-FF 142 will have an "H" level at its output terminal $Q_3$ for a rear focus condition and will have an "H" level at its output terminal $\overline{Q_3}$ for a front focus condition. Accordingly, for a rear focus condition, the "H" level from the output terminal $Q_3$ is fed through AND gate 145 to the terminal M, as indicated in FIG. 9(H) while the "H" level from the output terminal $\overline{Q_4}$ will be fed through AND gate 146 to the terminal N, as indicated in FIG. 9(I).

When either terminal M or N of the control circuit 46A assumes an "H" level, such output causes a drive current to flow through the motor 56 in a direction indicated by an arrow $a_0$ or $b_0$, as indicated in FIG. 6, causing the distance ring to rotate in order to move the taking lens. As the pulse shown in FIG. 9(L) is applied from RS-FF 134 to the count-down input terminal DOWN of the counter 126 during the rotation of the distance ring, the initial count preset into the counter 126 through the count-up input terminal UP is decremented one by one in response to each pulse applied to the input terminal DOWN. When a number of pulses which are equal to the preset initial count are applied to the input terminal DOWN, the output terminal $Q_0$ of the counter 126 changes to its "H" level, as shown in FIG. 9(M), and the leading edge of the output therefrom triggers the multivibrator 148 to produce a short pulse of "H" level, as indicated in FIG. 9(N). This pulse is fed through AND gate 149 and OR gate 150 to the negative logic input terminal of AND gates 145, 146, changing their outputs to an "L" level. Thus, either terminal M or N which has been maintained at its "H" level now changes to its "L" level, and hence the transistors 48, 50 and 54 or the transistors 49, 51 and 50 are turned off, deenergizing the motor 56 to stop the movement of the taking lens. At the same time, the output pulse of "H" level from the multivibrator 148 is also fed through AND gate 149 and OR gate 150 to the terminal Q of the control circuit 46A, and thence through OR gate 36 to the reset terminal R of the sequence controller 15 which is disposed within the camera. Since the terminal V then assumes an "L" level, the gate 83 produces an output of "H" level while the gate 84 produces an output of "L" level. Accordingly, RS-FF 73 is set, and the gate 81 delivers an output of "H" level which is fed to the terminal V.

When the terminal V resumes its "H" level, the terminal START of the converter 97A within the detector circuit 19A assumes its "H" level, whereby it again produces a pulse train representing the magnitude and the direction of a deviation in the focus position at the terminal B. Subsequently, the described operation is repeated to perform a distance adjustment toward an in-focus position. The number of times the distance adjustment is repeated is counted by the radix-n counter 85 within the sequence controller 15.

An operation which takes place when the pushbutton switch 10 on the camera is operated will now be considered. As mentioned previously, the pushbutton switch 10 is turned on when a shutter release button is depressed to half its stroke. When the electrical circuit disposed within the camera is energized from the battery 8, the described operation takes place, and the motor drive control circuit 46A is fed from the battery 38. The sequence controller 15 and the focus condition detector circuit 19A are fed from either battery 8 or 38, whichever produces a higher voltage at the junction 18. Each time the terminal V of the sequence controller 15 assumes an "H" level, the detector circuit 19A delivers through its terminal B and the contact 4 a single pulse train representing the magnitude and the direction of a deviation in the focus position, which is applied to the terminal K of the motor drive control circuit 46A. The taking lens is successively driven toward an in-focus position on the basis of such pulse train. When an in-focus condition is reached as the taking lens is driven a number of times which is less than a given count preset in the radix-n counter 85 or when the distance adjustment fails to reach an in-focus condition if the taking lens is driven a number of times corresponding to the preset count, the battery 38 ceases to supply power to the motor drive control circuit 46A, the sequence controller 15 and the focus condition detector circuit 19A, and the power sustain circuit formed by the transistors 9 and 12 within the camera is turned off.

When the shutter release button continues to be depressed beyond its half-stroke condition, a shutter release takes place. Thereupon, the switch 28 is closed in interlocked relationship with the shutter release operation. If an in-focus condition is established at this time, the taking lens will remain stationary while maintaining the in-focus position. However, if a shutter release takes place to close the switch 28 in the course of performing the series of focussing operations, the "H" level is fed through the switch 28 and OR gate 27 to the terminal L. This level is inverted by the inverter 145 to apply an "L" level to both END gates 145, 146. Accordingly, if either terminal M or N assumes an "H" level to energize the motor 56, both terminals M, N are changed to their "L" level, thus stopping the motion of the motor 56 upon shutter release. This prevents a picture from being taken in the course of movement of the taking lens. When a shutter release takes place, the photometry/exposure control circuit 26 operates to control the shutter in order to provide a proper amount of exposure. The switch 28 opens upon completion of the shutter release operation. The terminal L then reverts to its "L" level, but since the reset pulse from the reset circuit 30 is fed through OR gate 36 to the terminal R in synchronism with the opening of the switch 28 to render it at "H" level momentarily, the output from AND gate 83 sets RS-FF 73 to render the terminal V at its "H" level, thus returning to the initial condition of the sequence control operation. Accordingly, a series of focussing operations which are interrupted by the closure of the switch 28 are re-initiated.

What is claimed is:

1. An automatic focussing apparatus, comprising:
a first battery internally housed within a camera which is adapted to mate with a taking lens barrel;
a second battery internally housed within the lens barrel;
a camera operating member disposed on the camera;
a lens operating member disposed on the lens barrel;
an in-focus detector circuit disposed within the camera for detecting an in-focus condition on an imaging surface and for providing information which is utilized to drive a taking lens toward an in-focus position;
a motor drive circuit disposed within the lengs barrel and including a motor for moving the taking lens to an in-focus position in accordance with the information fed from the in-focus detector circuit;
first feed means for feeding the in-focus detector circuit from the first battery when the camera operating member is operated;
second feed means capable of feeding said motor drive circuit from said second battery and feeding said in-fo detector circuit through a contact dispose between said lens barrel and said camera body when said lens operating member is operated;
and actuating means for actuating said second feed means when said camera operating member is operated.

2. An automatic focussing apparatus according to claim 1 in which the camera operating member comprises a normally open pushbutton switch which is closed during a first stroke of a shutter release button as the latter is depressed.

3. An automatic focussing apparatus according to claim 2, further including a normally open switch which is closed subsequent to the closure of the pushbutton switch closure during a second stroke of the shutter release button as the latter is depressed, the switch stopping a movement of the taking lens.

4. An automatic focussing apparatus according to claim 1 in which the in-focus detector circuit delivers a focus condition signal, the number of pulses in said signal representing the magnitude of a deviation from an in-focus position, responsive to a focus condition on the imaging surface, the detector circuit supplying the focus condition signal to one of two signal paths which is selected in accordance with the direction of the deviation, and in which the motor drive circuit determines a direction in which the taking lens is to be moved in accordance with the signal path delivering the focus condition from the in-focus detector circuit and drives the taking lens to an in-focus position by means of the motor, through a distance by which the taking lens is to be moved and which is determined on the basis of the number of pulses comprising the focus condition signal transmitted through the selected signal path to the lens barrel side.

5. An automatic focussing apparatus according to claim 1 in which the in-focus detector circuit delivers on a single signal path a signal pulse train representing a focus condition signal representing the magnitude and the direction of a deviation in a focus position on the imaging surface and in which the motor drive circuit operates the motor to move the taking lens to an in-focus position by determining the magnitude and the direction which the taking lens is to be moved, on the basis of the pulse train transmitted from the detector circuit to the lens barrel side through the single signal path.

6. An automatic focussing apparatus according to claim 5 in which the motor drive circuit includes means which determines the direction of movement of the taking lens by examining if the number of pulses contained in said pulse train is an odd or even number and which determines the amount of movement of the taking lens as a function of the number of pulses.

7. An automatic focussing apparatus according to claim 1 in which the first feed means comprises a pushbutton switch which forms the camera operating member, a diode connected in series between the pushbutton switch and a feed terminal of the detector circuit, and a power sustain circuit including a semiconductor switch connected in parallel with the pushbutton switch and which is rendered conductive when the pushbutton switch is operated.

8. An automatic focussing apparatus according to claim 1 in which the second feed means comprises a pushbutton switch which forms the lens operating member and which is connected in series between the second battery and a feed terminal of the motor drive circuit, a diode connected in series between the pushbutton switch and a feed terminal of the in-focus detector circuit, and a power sustain circuit including a semiconductor switch connected in parallel with the pushbutton switch and which is rendered conductive when the pushbutton switch is operated.

9. An automatic focussing apparatus according to claim 1 in which said second feed means comprises a first pushbutton switch which forms the camera operating member, a first power sustain circuit including a first semiconductor switch connected in parallel with the first pushbutton switch and which is rendered conductive when the first pushbutton switch is operated, a second pushbutton switch which forms the lens operating member and which is connected in series between the second battery and a feed terminal of the motor drive circuit, a second power sustain circuit including a second semiconductor switch connected in parallel with the second pushbutton switch and which is rendered conductive when the second pushbutton switch is operated, and a third power sustain circuit for rendering the second semiconductor switch conductive when the first pushbutton switch is turned on.

10. The automatic focussing apparatus of claim 4 further including means responsive to movement of the lens under control of the motor for generating a lens positioning signal;
   means for decoupling the motor from the second battery when the lens positioning signal compares with the focus condition signal.

11. The automatic focussing apparatus according to claim 5 in which the detector circuit includes means for generating a signal pulse train of $2n+k$ pulses, where n represents the deviation from the in-focus condition and is a real integer, and k represents the direction of the deviation from the in-focus condition, and k is either equal to 1 or 0.

12. The automatic focussing apparatus of claim 11 further including means responsive to the movement of the lens for generating a lens positioning signal comprised of pulses, each representing an increment of movement;
   means for decoupling the motor from the second battery when the number of pulses comprising the lens positioning signal is equal to n.

13. The automatic focussing apparatus of claim 11 further comprising means responsive to the number of pulses in signal pulse train for determining the value of k.

14. The automatic focussing apparatus of claim 13 comprising means responsive to the means for determining the value of k for controlling the direction which the motor moves the lens.

15. The automatic focussing apparatus of claim 10 comprising means for counting the number of times the motor is operated to produce an in-focus condition; and
   means for terminating the focussing operation when a predetermined count is reached.

16. The automatic focussing apparatus of claim 15 further comprising means responsive to an in-focus condition for resetting said counting means.

* * * * *

UNITED STATES PATENT AND TRADEMARK OFFICE
CERTIFICATE OF CORRECTION

PATENT NO. : 4,557,579          Page 1 of 2

DATED      : December 10, 1985

INVENTOR(S) : Yukio Nakajima

It is certified that error appears in the above-identified patent and that said Letters Patent is hereby corrected as shown below:

Column 3, line 21 change "be selectively" to --selectively be--.

Column 4, line 47 change "schnitt" to --Schmitt--.

Column 4, line 68 after "RS-FF" insert --77--.

Column 5, line 2 after "RS-FF" delete ",".

Column 6, line 58 change "a" to --$\underline{a}$--.

Column 6, line 62 change "b" to --$\underline{b}$--.

Column 9, line 32 change "a$_0$ or b$_0$" to --$\underline{a_0}$ or $\underline{b_0}$--.

Column 9, line 37 change "a$_0$" to --$\underline{a_0}$--.

Column 9, line 47 change "b$_0$" to --$\underline{b_0}$--.

Column 9, line 61 change "a" to --$\underline{a}$--.

Column 9, line 64 change "b" to --$\underline{b}$--.

UNITED STATES PATENT AND TRADEMARK OFFICE
CERTIFICATE OF CORRECTION

PATENT NO. : 4,557,579

DATED : December 10, 1985

INVENTOR(S) : Yukio Nakajima

It is certified that error appears in the above-identified patent and that said Letters Patent is hereby corrected as shown below:

Column 9, line 65 change "a and b" to --$\underline{a}$ and $\underline{b}$--.

Column 11, line 13 after "above" insert --,--.

Column 13, line 61 change "schmitt" to --Schmitt--.

Claim 1, line 13 change "lengs" to --lens--.

Claim 1, line 22 change "in-fo" to --in-focus-- and change "dispose" to --disposed--.

Claim 3, line 6 after "switch" insert --closure--.

Signed and Sealed this

Twenty-fifth Day of February 1986

[SEAL]

Attest:

Attesting Officer

DONALD J. QUIGG

Commissioner of Patents and Trademarks